July 19, 1960  D. J. LEHMICKE  2,945,739
PROCESS OF MELT SPINNING
Filed June 23, 1955  2 Sheets-Sheet 1
FIG I
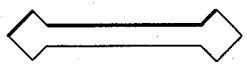
FIG II
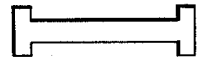
FIG III
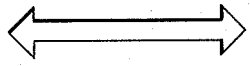
FIG IV
FIG V
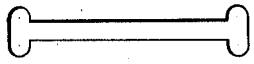
FIG VI
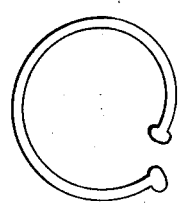
FIG VII    FIG VIIa 
FIG VIII 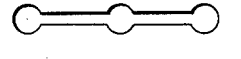   FIG VIIIa    FIG XI 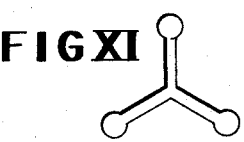
FIG IX 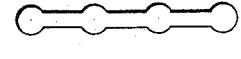   FIG IXa 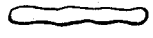   FIG XIa 
FIG X    FIG Xa 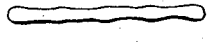
FIG XIII 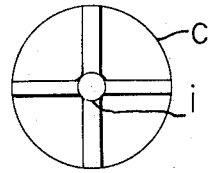
FIG XII  FIG XIIa
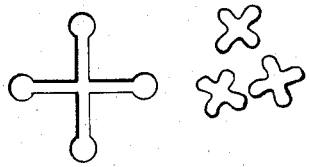
INVENTOR
DAVID J. LEHMICKE
BY Carl A. Hechmer
ATTORNEY July 19, 1960  D. J. LEHMICKE  2,945,739
PROCESS OF MELT SPINNING
Filed June 23, 1955  2 Sheets-Sheet 2
FIG. XIV
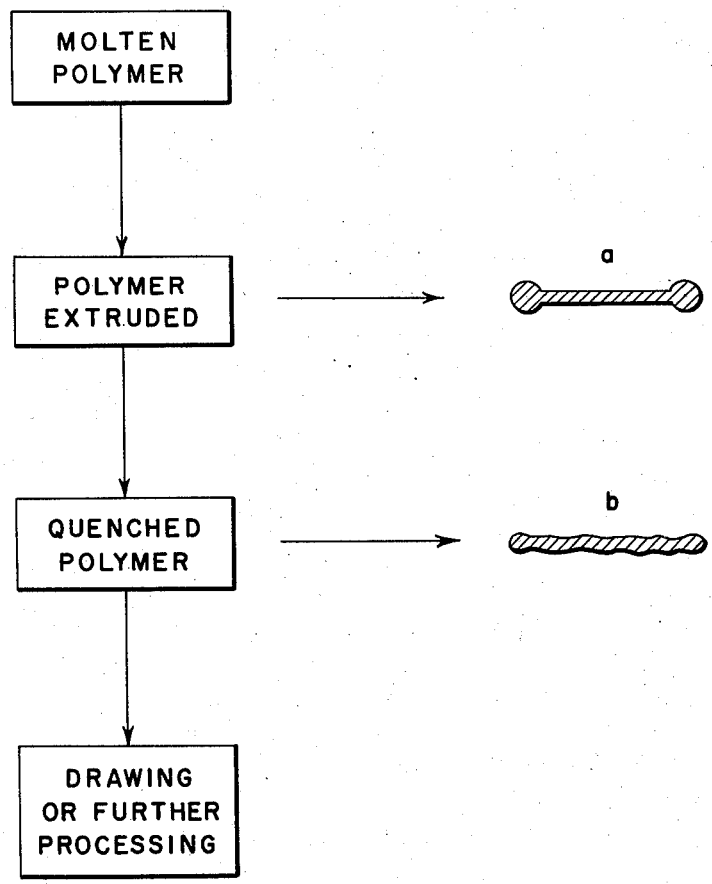
INVENTOR
DAVID J. LEHMICKE
BY  *Carl A. Hechmer*
ATTORNEY

United States Patent Office 2,945,739
Patented July 19, 1960

2,945,739
PROCESS OF MELT SPINNING

David J. Lehmicke, Wilmington, Del., assignor to E. I. du Pont de Nemours and Company, Wilmington, Del., a corporation of Delaware Filed June 23, 1955, Ser. No. 517,434

5 Claims. (Cl. 18—54)

This invention relates to process. More specifically it is concerned with a novel process for the melt extrusion of a linear polymer.

Although attempts have been made to form non-round filaments by extrusion of linear polymer melt through orifices of various shapes, the surface-tension forces of the polymer are so high in the newly-formed fiber adjacent the spinneret face that most of the shape imposed by the orifice outline is lost before the fiber can be quenched, so that the resulting filaments are substantially circular in cross-section.

It is an object of the present invention to provide a process which will permit a high degree of filament modification in the melt extrusion of a linear polymer.

Another object is to provide a process with which highly modified filaments of low denier per filament can be melt spun.

A further object is to provide a process with which highly modified filaments can be melt spun from a linear polymer with high efficiency.

These and other objects will become apparent in the course of the following specification and claims.

In accordance with the present process invention a spinneret for the melt extrusion of a linear polymer is provided by forming the orifices of the said spinneret in the shape of a slot with abruptly expanded tips. By "slot" is meant a substantially rectangular aperture with a length 5 or more times its width. The "expanded tips" of the slots are preferably circular, but may be rectangular, square, diamond shaped or oval, provided that the longer dimension of the non-circular embodiment is approximately perpendicular to the length of the slot. The spinneret may contain a single or multiple orifices. Various slot designs such as in the form of a Y, a T, a cross, a spiral and the like are possible. In each instance the extremity of the design is expanded.

The invention will be more readily understood by reference to the drawings.

Figures I to V illustrate various orifice outlines having abrupt tip expansion.

Figure VI illustrates a spiral shaped slot design having abruptly expanded tips, and suitable for the formation of a ribbon or pellicle.

Figures VII to X inclusive illustrate several dog-bone shaped orifices containing round, abrupt tip expansions. In Figures VIII to X inclusive, abrupt, round expansions are also provided along the slot body.

Figures VII(a) to X(a) are cross-sectional elevations of filaments produced using the corresponding slot design shown in Figures VII to X inclusive.

Figure XI illustrates a Y type design having abruptly expanded tips.

Figure XI(a) is a cross-sectional elevation of a yarn spun from a spinneret having orifices of the Y design of Figure XI.

Figure XII illustrates a "cross" type design having abruptly expanded tips.

Figure XII(a) is a cross-sectional elevation of a yarn spun from a spinneret having orifices of the "cross" design of Figure XII.

Figure XIII illustrates a general method of characterizing the degree of modification of filaments, melt spun employing a process of the present invention as compared with conventional filaments of circular cross-section. The degree of modification may be expressed numerically as the ratio of the diameter of the circle "$c$" circumscribed about the filament cross-section divided by the diameter of the circle "$i$" inscribed therein. This ratio will hereinafter be called the "filament ratio." According to this system, a truly circular filament would have a filament ratio of 1.0. A ribbon-like filament of width 6 times its thickness would have a filament ratio of 6.0.

Figure XIV is a flow sheet type diagram of the process of the present invention. The cross-sections ($a$) and ($b$) to the right of the flow sheet show the approximate cross-sectional shape of the polymer stream at two different stages of the process. In the illustrated process, the orifice of Figure VII is used and the polymer assumes substantially the shape of the orifice upon extrusion as shown by the cross-sectional area ($a$) of Figure XIV. After the polymer is quenched and becomes solid, the expanded portions of the polymer stream are substantially absent from the cross-sectional extremities of the filament as shown by the cross-sectional area ($b$) of Figure XIV.

The following examples are cited to illustrate the invention. They are not intended to limit it in any way.

Example 1

Polyhexamethylene adipamide containing 0.3% by weight of $TiO_2$ delusterant and having a relative viscosity of 35 (as defined in United States Patent No. 2,385,890) is spun to yarn using the apparatus of Greenewalt disclosed in United States Patent No. 2,217,743.

The grid and melt pool temperature is maintained at 288° C., and the molten polymer is blanketed with an atmosphere of nitrogen. The polymer is spun through a 15-hole spinneret designated hereinafter as "Spinneret A," each orifice of which is of cruciform shape, substantially as shown in Figure XII.

The arms of the cross are slots forty thousandths of an inch (forty mils) long and two mils wide. The abrupt expansions at the ends of the slots are circular and are 5 mils in diameter, making a total design length, including the abrupt circular expansions, of 50 mils.

The yarn is extruded through the orifices and is quenched by substantially room temperature air directed transversely to the filament bundle as shown by Heckert in United States Patent No. 2,273,105. The extruded yarn which is of 55 denier, is collected at the rate of about 1200 yards per minute. The as-spun yarn has a relative viscosity of 47.3. It is then cold drawn to 1.95 times its extruded length in the apparatus disclosed in United States Patent No. 2,289,232. Its final denier is 29.7 or about 3.0 denier per filament. A magnified cross-section of the drawn yarn has substantially the appearance of Figure XII(a). The average filament ratio of the spun yarn is 3.35, and of the drawn yarn is 3.53, showing that the drawn yarn is even more highly modified (i.e., differs more widely from the circular) than the undrawn. When Spinneret A is replaced by a 15-hole spinnert designated hereinafter as "Spinneret B" in which the orifices consist only of slots 40 mils long and 3 mils wide (without the abrupt expansions), such as are disclosed in the prior art, the filament ratio of the drawn yarn is only 1.9, even though a higher yarn viscosity (54.5) is obtained. Generally increased viscosity assists in obtaining a higher filament ratio.

When Spinneret B is replaced by a 15-hole spinneret designated hereinafter as "Spinneret C" in which the orifices are like those of B except that the slots are only 2 mils wide, it is impossible to spin any appreciable amount of yarn because the orifices are repeatedly obstructed by particles in the molten stream.

*Example 2*

The experiment of Example 1 is repeated, using a spinneret with orifices in the shape of a Y, and having a circular expansion drilled in the tip of each slot, substantially as shown in Figure XI. The slot comprising each leg of the Y is 2 mils wide and 20 mils long, with a 5 mil diameter circular expansion added at the tip of each slot. The slots intersect at angles of 120°. The as-spun yarn has a relative viscosity of 51.5. Its cross-section is approximately as shown in Figure XI(a). After cold drawing, it has a filament ratio of 4.2.

*Example 3*

A batch of polyethylene terephthalate having a relative viscosity of 31 (measured in a solvent consisting of 7 parts by weight of trichlorophenol and 10 parts of phenol) is melted on a grid melting apparatus maintained at 288° C. and is extruded as filaments through a spinneret consisting of 34 orifices, each of which has the dog-bone outline shown in Figure VII. The slots of these orifices are 3 mils wide and 40 mils long. A 7-mil diameter circular expansion is provided at the tip of each slot. The melting and extrusion equipment is as described by Greenewalt referred to above. The spun filaments are quenched as in Example 1 and wound onto a package at 837 yards per minute. The yarn is drawn 2.91 times its extruded length. The drawn yarn has a cross-section as shown in Figure VII(a), with an average filament ratio of 4.0, and a denier per filament of 3.0. When the above spinneret is replaced with one having orifices which consist of slots 3 mils wide by 40 mils long, and with one circular expansion 7 mils in diameter at the center of the slot, the average filament ratio of the drawn yarn obtained therefrom is less than 3.0.

The advantages obtained by the use of this invention are very clearly demonstrated in spinning filaments of flat or ribbon cross-section. Such filaments desirably have as high a degree of modification (i.e., ratio of width to thickness) as possible for a given denier per filament. For many end uses they should also have as low a denier per filament as possible, preferably about 1.5. The production of such filaments utilizing this invention is shown by the following example.

*Example 4*

A batch of polyhexamethylene adipamide flake is prepared so that the polymer has a relative viscosity of 39. The polymer is melted and spun to filaments as in Example 1, using a spinneret designated hereinafter as "Spinneret D" which has 36 orifices, each of conventional slotted shape. The slots are 73 mils long and 3 mils wide. The filaments are quenched as in Example 1, and the spun yarn, which has a denier of 108, is wound up at 980 yards per minute. The relative viscosity of the yarn is 52.8. The yarn can be drawn to only 1.7 times its original length without excessive filament breakage. The drawn yarn is 1.8 denier per filament and has a filament ratio of 5.7. The product has an acceptable filament ratio, but for many uses the denier per filament is too high by about 20%.

If the attempt is made to decrease the denier of the product by increasing the spinning speed by about 20% (to about 1200 yards per minute) while maintaining the same polymer throughput, the spun denier is decreased by a similar amount (to about 86). However, the lower denier as-spun yarn is now so highly oriented that it cannot be drawn more than about 1.3 times its original length without excessive breakage, so that in this case the final product is still about 1.8 denier per filament.

If, on the other hand, the windup rate is maintained constant at 980 yards per minute and the polymer throughput is decreased, the molten polymer does not jet freely from the spinneret orifices, but instead wets the face of the spinneret, causing the spinning interruption known as "drips."

When Spinneret D is replaced by another spinneret, designated hereinafter as "Spinneret E" containing 36 conventional slotted orifices 60 mils long by 2 mils wide, filaments cannot be successfully extruded because particles in the melt continually obstruct parts of the slots, producing split filaments and defective yarn.

However, when Spinneret E is replaced by a third spinneret, designated hereinafter as "Spinneret F," made according to this invention, a preferred product is obtained under the original spinning conditions of this example. Spinneret F has 36 holes, each combining slots and holes substantially as shown in Figure X. In each orifice the slot is 2 mils wide and 12 mils long between the circular expansions. Each of the five circular expansions between and joining the slots of each design is 5 mils in diameter. The total overall length of the design of each orifice is therefore 73 mils. With a windup speed of 980 yards per minute, and a spun denier of 108, the 36 filament yarn can be drawn 2.15 times its original length without excessive filament breakage, and the drawn product has a final denier per filament somewhat less than 1.5, and a filament ratio of 5.7.

It is apparent from the foregoing example that by using the spinneret orifices of this invention a new product of high filament ratio and low denier per filament is produced, which could not be produced using spinnerets of the prior art.

The degree to which a given filament is modified from the normal circular cross-section depends on the shape of the spinneret orifice, and the rate at which the filament is quenched after extrusion. Rapid quenching freezes the filament into an approximation of the orifice shape before surface tension forces cause it to become cylindrical. High viscosity polymer is helpful in attaining highly modified filaments, because it maintains its extruded shape better before quenching. As a guide in this regard, polyhexamethylene adipamide of at least 40 and desirably above 50 relative viscosity (measured on the spun yarn) is preferred for the most highly modified filaments. However, when extruding polymer of any viscosity, using the spinneret orifices designed in accord with this invention, higher degrees of modification are obtained than is possible with spinnerets of the prior art.

It may sometimes be desirable to cool the spinneret and filter pack to bring the polymer nearer to the solidification temperature at extrusion, or to decrease the temperature or increase the volume of the cooling air in order to hasten the quenching of the yarn. In general, neither of these changes is necessary with high viscosity polymer.

The essence of this invention is the combination in a spinneret orifice of a slot and at least one abrupt expansion in each tip of each slot. These abrupt expansions appear to have two functions. They provide a reservoir of polymeric material which stiffens the extruded shape, holding the shape and resisting surface tension forces until the filament solidifies. They also provide channels through which pieces of sand, foreign material and polymer gel which might otherwise obstruct the slots, are extruded. Orifices with slots two mils wide are almost always inoperable without the expansions, and even with wider slots the continuity of spinning is improved by the addition of abrupt expansions, as described hereinabove.

For fine denier filaments of cross, Y or ribbon shape, the slots are ordinarily as narrow as is mechanically practical to construct. Two mil slots have been satisfactory in this respect. Although these narrow slots are more easily obstructed, as stated hereinabove, the addition of abrupt expansions at their tips, in accord with this invention renders them operable. However, it is usual to use a very fine screen (e.g., 200 mesh) above the spinneret to reduce orifice obstruction.

Although the minimum number of abrupt expansions per slot is two, more are often beneficial, particularly when spinning ribbon filaments. The expansions may be placed along the slot, as shown in Figures VIII to X inclusive. An excessive number of abrupt expansions must be avoided, since the orifice area is thereby substantially increased and the polymer jet velocity decreased, increasing the likelihood of drips. In general, it is preferable to have an expansion spaced every 10 to 20 mils along the slots. It should be noted that in the special case of intersecting slots as in the Y shaped, T shaped and cruciform designs, the point of intersection acts as an expansion. In some cases it may be desirable to enlarge the intersection to the same diameter as the expansions at the slot tips. The diameter of the abrupt tip expansions is usually about two times the slot width, but diameters up to 5 times the slot width are useful. In general, slots up to 50 or more times as long (overall length including holes) as they are wide can be used, as long as the increased orifice area does not produce such a low polymer jet velocity at the required throughput that drips result.

The spinneret orifices described herein may be formed by a variety of methods well-known to the art. A satisfactory procedure is to drill a flat bottomed counterbore of about ⅛" diameter from the back of the spinneret blank, until only about 10 mils of metal thickness remains. For a cross-shaped slot (Figure I) with slots 2 x 40 mils, a punch with a tip 0.002" x 0.040" is used. The die below the spinneret is set to a width of 0.003", and a steel shim 0.002" thick is placed between the spinneret and the die to prevent tearing. The vertical arm of the cross is then punched from the counterbore side, raising a dimple on the spinneret face. The depth of punching is adjusted so that when the dimple is sanded off, a slot 2 x 40 mils appears. When this has been done, the horizontal slot is punched and the process is repeated. Circular expansions of the desired diameter are then drilled at the slot tips. To improve orifice to orifice uniformity, the slots and abrupt expansions may be broach burnished from the face side of the spinneret.

The punch used to form the slots may have a rectangular tip with dimensions substantially the same as those of the slot which is to be formed. The blade of the punch may have parallel or arcuate sides, but it is preferred to employ a wedge shaped blade having an included angle of about 30°. The slot produced by such a punch will thus have a somewhat tapered cross-section, converging in the direction of polymer flow.

The spinneret in which the orifice construction of this invention is produced may be of any conventional material employed in spinneret construction for melt spinning. The stainless steels are especially suitable.

In preparing yarn with non-circular cross-section, it is essentail to obtain good inter-filament uniformity in order to avoid excessive filament breakage in the drawing step. It has been found helpful to provide a distribution space or plenum chamber between the sand filter pack and the spinneret. Even when such a distribution space is provided, small variations in dimensions from orifice to orifice impose a difference in flow resistance across each orifice, so that unequal volumes of polymer are extruded from different orifices per unit time. This effect can be minimized by adding a carefully controlled, uniform, relatively large (as compared to the pressure drop through the spinneret orifice proper) pressure drop to the polymer stream extruded from each orifice, whereby hole-to-hole variations are minimized. One means of accomplishing this is to use a capillary metering plate, which is in contact with the back of the spinneret, and which has a single capillary of uniform length and diameter discharging into the counterbore of each spinneret orifice. The polymer stream extruded from each orifice must thus pass first through the long capillary and then through the slotted orifice. Such long, uniform metering capillaries may be drilled by conventional means and thereafter the drilling irregularities of the bore removed by broach burnishing, using a hardened steel ball or a substantially ball-shaped broach of the desired diameter.

Fabrics woven or knitted from the highly modified cruciform and Y-shaped filaments produced in accord with this invention have increased covering power and resilience, and a firmer, crisper hand as compared to fabrics of similar construction and weight made from round filaments of the same denier per filament. Flat or ribbon-shaped filaments likewise have increased covering power, and in addition have especial utility in preventing "pilling." It has long been known that when loosely woven or knitted fabrics made from natural staple fibers (e.g., wool, cotton) are subjected to wear, small fibrous balls known as "pills" form on the abraded surface. Due to the inherently weak nature of these fibers these "pills" usually do not accumulate to a highly objectionable degree, since they are abraded away. With the advent of the newer synthetic fibers, however, especially those made from the condensation polymers, the problem became much more serious, since these fibers are so highly resistant to abrasion that the pills which form on the fabric surface do not wear away, but continue to accumulate. It has been found that when such polymers, which are normally extruded as cylindrical melt-spun filaments, are extruded as ribbons, the pilling tendency of fabrics made therefrom is markedly reduced. It has also been found that the greater the filament ratio in such fabrics, the lower the pilling tendency, as illustrated in Table I, comparing fabrics of similar construction.

TABLE I

Pilling Tendency of Nylon Staple Fabrics

| Staple Denier Per Filament | Staple Filament Ratio | Pills Per Square Inch (Laboratory test: 5 min. brushing + 5 min. sponging) |
|---|---|---|
| 3.0 | 1 (round) | 2.0 |
| 3.0 | 2.75 (flat) | 0.4 |
| 4.5 | 2.07 (flat) | 0.75 |
| 4.5 | 3.54 (flat) | 0.25 |
| 4.5 | 4.64 (flat) | 0.0 |
| 6.0 | 3.0 (flat) | 0.0 |

The data in the table also indicate that the lower the filament denier the greater the pilling tendency; to overcome this, it is obvious that a higher degree of filament modification is required for low denier filaments, in order to obtain satisfactory freedom from pilling. Filament deniers of about 1.6 or lower are highly desirable for synthetic staple to be spun to fine count yarn on the cotton system. These deniers are also desirable for blending with cotton for the preparation of blended yarn and fabrics. Such highly modified melt-spun filaments of low denier cannot be prepared by prior art processes, but can be prepared by employing the spinneret orifices of this invention, as shown by Example 4.

This invention is applicable broadly to all types of fiber-forming synthetic linear polymers which are capable of being melt spun. Illustrative of polyamides and copolyamides which can be employed in the process of this invention are those described in any of the United States Patents Nos. 2,071,250; 2,071,253; 2,130,523; 2,130,948; 2,190,770; 2,252,555; 2,252,557 and 2,374,137. Some of the useful examples of polyesters and copolyesters are shown in United States Patents Nos. 2,071,250; 2,071,251; 2,465,150 and 2,465,319.

The filaments produced in accordance with the present invention may be employed as yarns and converted, e.g., by weaving into fabric patterns of any conventional design by known methods. Furthermore, these bodies may be combined with other known textiles to produce mixed yarns and fabrics.

Many equivalent modifications will be apparent to those skilled in the art from a reading of the above without a departure from the inventive concept.

What is claimed is:

1. A melt spinning process for the formation of a textile filament which comprises extruding a molten polymer selected from the group consisting of a polycarbonamide and a polyester wherein the amide and ester units are integral parts of the main polymer chain through a spinneret to form a polymer stream, the cross-section of the said stream being expanded from 2 to 5 times its narrowest width on each of its extremities and having a length of at least 5 times its narrowest width, quenching the said polymer stream to form a modified filament in which the expanded portions are substantially absent from the cross-sectional extremities of the filament and thereafter drawing the said filament.

2. The process of claim 1 wherein the polymer is polyhexamethylene adipamide.

3. The process of claim 1 wherein the polymer is polyethylene terephthalate.

4. The process of claim 1 wherein the cross section of said polymer stream is in the form of a Y.

5. The process of claim 1 wherein the cross section of said polymer stream is in the form of a ribbon.

References Cited in the file of this patent

UNITED STATES PATENTS

| | | |
|---|---|---|
| 1,773,969 | Dreyfus | Aug. 26, 1930 |
| 2,002,153 | Mendel | May 21, 1935 |
| 2,217,743 | Greenewalt | Oct. 15, 1940 |
| 2,273,105 | Heckert | Feb. 17, 1942 |
| 2,369,191 | Thurmond | Feb. 13, 1945 |
| 2,373,892 | Hickey | Apr. 17, 1945 |
| 2,508,799 | Reis | May 23, 1950 |
| 2,637,893 | Shaw | May 12, 1953 |
| 2,723,424 | Veit | Nov. 15, 1955 |
| 2,831,748 | Finlayson et al. | Apr. 22, 1958 |

FOREIGN PATENTS

| | | |
|---|---|---|
| 430,741 | Germany | June 26, 1926 |
| 269,130 | Italy | Nov. 9, 1929 |
| 349,448 | Italy | June 15, 1937 |

UNITED STATES PATENT OFFICE

CERTIFICATE OF CORRECTION

Patent No. 2,945,739                                July 19, 1960

David J. Lehmicke

It is hereby certified that error appears in the printed specification of the above numbered patent requiring correction and that the said Letters Patent should read as corrected below.

Column 1, line 37, strike out "invention"; line 54, for "expansion" read -- expansions --.

Signed and sealed this 27th day of December 1960.

(SEAL)
Attest:

KARL H. AXLINE
Attesting Officer

ROBERT C. WATSON
Commissioner of Patents